(12) United States Patent
Versteylen et al.

(10) Patent No.: US 9,198,457 B2
(45) Date of Patent: *Dec. 1, 2015

(54) ABSORBENT PADS FOR FOOD PACKAGING

(75) Inventors: Sayandro Versteylen, Ontario, CA (US); Lindsay Snowden Riehle, Beaumont, CA (US)

(73) Assignee: Paper-Pak Industries, Laverne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/921,362

(22) PCT Filed: Mar. 7, 2009

(86) PCT No.: PCT/US2009/036442
§ 371 (c)(1),
(2), (4) Date: Sep. 7, 2010

(87) PCT Pub. No.: WO2009/111768
PCT Pub. Date: Sep. 11, 2009

(65) Prior Publication Data
US 2011/0165294 A1    Jul. 7, 2011

Related U.S. Application Data

(60) Provisional application No. 61/034,751, filed on Mar. 7, 2008.

(51) Int. Cl.
*B65D 81/26* (2006.01)
*A23L 3/3436* (2006.01)
(Continued)

(52) U.S. Cl.
CPC ............. *A23L 3/3436* (2013.01); *A23B 4/16* (2013.01); *A23B 4/20* (2013.01); *A23B 4/22* (2013.01); *A23L 3/3418* (2013.01); *A23L 3/3427* (2013.01);
(Continued)

(58) Field of Classification Search
CPC ............ A23B 4/26; A23B 4/32; A23B 4/325; A23L 3/3427; A23L 3/3463; B65D 81/264; B65D 81/265; B65D 81/266; B65D 81/267; B65D 81/2007; B65D 81/2023
USPC ................... 426/110, 133, 143, 432; 206/204
See application file for complete search history.

(56) References Cited

U.S. PATENT DOCUMENTS 3,575,287 A    4/1971    Graveley .................... 206/204
3,577,492 A *  5/1971    Welsh et al. ................. 264/120
(Continued)

FOREIGN PATENT DOCUMENTS

WO    WO 9426621 A1    11/1994
WO    WO 2006078868 A2   7/2006
WO    WO 2007067240 A1   6/2007

OTHER PUBLICATIONS

Definition of area: Oxford English Dictionary; available at: http://www.oed.com/view/Entry/10505?redirectedFrom=area&print; accessed on Jul. 29, 2014.*

(Continued)

*Primary Examiner* — Michele L Jacobson
*Assistant Examiner* — Walter Moore
(74) *Attorney, Agent, or Firm* — Ohlandt, Greeley, Ruggiero & Perle, LLP

(57) ABSTRACT

Food packaging with absorbent food pads having one or more active agents therein is disclosed. Arrangements of absorbent structures and active agents in the absorbent food pads are provided.

18 Claims, 4 Drawing Sheets

(51) Int. Cl.
  *A23L 3/3427* (2006.01)
  *A23L 3/3418* (2006.01)
  *A23L 3/3571* (2006.01)
  *A23B 4/16* (2006.01)
  *A23B 4/20* (2006.01)
  *A23B 4/22* (2006.01)
  *A23L 3/3454* (2006.01)
  *A23B 4/32* (2006.01)

(52) U.S. Cl.
  CPC ............... *A23L 3/3571* (2013.01); *A23B 4/32* (2013.01); *A23L 3/3454* (2013.01); *B65D 81/264* (2013.01); *B65D 81/267* (2013.01)

(56) References Cited

U.S. PATENT DOCUMENTS

| | | | | |
|---|---|---|---|---|
| 3,814,101 | A * | 6/1974 | Kozak | 604/370 |
| 4,275,811 | A | 6/1981 | Miller | 206/204 |
| 4,332,845 | A | 6/1982 | Nawata et al. | 428/35 |
| 4,551,377 | A | 11/1985 | Elves et al. | 428/137 |
| 4,589,876 | A | 5/1986 | Van Tilburg | 604/385.04 |
| 4,856,650 | A | 8/1989 | Inoue | 206/204 |
| 4,935,276 | A | 6/1990 | Pawlowski et al. | 428/35.7 |
| 4,935,282 | A | 6/1990 | Pawlowski et al. | 428/121 |
| 5,046,604 | A | 9/1991 | Forhetz et al. | 206/0.5 |
| 5,154,960 | A | 10/1992 | Mucci et al. | 428/283 |
| 5,320,895 | A * | 6/1994 | Larsonneur et al. | 428/137 |
| 5,436,067 | A | 7/1995 | Hanamoto et al. | 428/283 |
| 5,468,447 | A | 11/1995 | Bermas | 422/5 |
| 5,492,705 | A | 2/1996 | Porchia et al. | 426/106 |
| 5,837,358 | A * | 11/1998 | Bauer et al. | 428/213 |
| 5,839,572 | A | 11/1998 | Yeager | 206/204 |
| 5,941,052 | A * | 8/1999 | Evangelisti | 53/433 |
| 5,945,152 | A | 8/1999 | Purser | 426/646 |
| 6,156,020 | A | 12/2000 | Roe et al. | 604/385.01 |
| 6,171,695 | B1 * | 1/2001 | Fontenot et al. | 428/337 |
| 6,376,034 | B1 | 4/2002 | Brander | 428/35.7 |
| 6,478,147 | B1 | 11/2002 | Brander et al. | 206/204 |
| 6,579,595 | B2 | 6/2003 | Lemaire | 428/174 |
| 6,592,919 | B1 | 7/2003 | Matthews et al. | 426/124 |
| 6,695,138 | B1 | 2/2004 | Colombo et al. | 426/124 |
| 6,713,152 | B2 | 3/2004 | Chen et al. | 428/35.2 |
| 6,823,774 | B2 | 11/2004 | Uranaka et al. | 99/467 |
| 6,890,373 | B2 | 5/2005 | Nemoto et al. | 95/90 |
| 6,926,862 | B2 | 8/2005 | Fontenot et al. | 422/50 |
| 6,936,342 | B2 | 8/2005 | Shibata et al. | 428/304.4 |
| 6,966,436 | B2 | 11/2005 | Baldwin et al. | 206/204 |
| 6,979,485 | B2 | 12/2005 | Price et al. | 428/137 |
| 6,986,931 | B2 | 1/2006 | Ackerman et al. | 428/137 |
| 6,991,844 | B2 | 1/2006 | LeBoeuf et al. | 428/137 |
| 7,022,395 | B2 | 4/2006 | Ackerman et al. | 428/137 |
| 7,026,034 | B2 | 4/2006 | LeBoeuf et al. | 428/131 |
| 7,056,569 | B2 | 6/2006 | Price et al. | 428/137 |
| 7,063,879 | B2 | 6/2006 | Trent et al. | 428/137 |
| 7,063,880 | B2 | 6/2006 | Karul | 428/143 |
| 7,078,088 | B2 | 7/2006 | Price et al. | 428/137 |
| 7,165,306 | B2 | 1/2007 | Bezek et al. | 29/453 |
| 7,189,666 | B2 | 3/2007 | Finnegan et al. | 442/153 |
| 7,306,094 | B2 | 12/2007 | Baldwin et al. | 206/204 |
| 7,320,742 | B2 | 1/2008 | O'Neill et al. | 162/114 |
| 7,771,812 | B2 | 8/2010 | Beu et al. | 442/381 |
| 2002/0131987 | A1 * | 9/2002 | Carnazzo | 424/406 |
| 2003/0049410 | A1 | 3/2003 | Munagavalasa et al. | 428/137 |
| 2004/0131736 | A1 | 7/2004 | Pan et al. | 53/474 |
| 2004/0247750 | A1 | 12/2004 | Finnegan et al. | |
| 2005/0008737 | A1 | 1/2005 | Kwon | 426/124 |
| 2006/0006076 | A1 | 1/2006 | Retzner | 206/204 |
| 2006/0029771 | A1 | 2/2006 | O'Neill et al. | 162/114 |
| 2006/0093788 | A1 | 5/2006 | Behm et al. | 428/137 |
| 2006/0144811 | A1 | 7/2006 | Cheng | 206/527 |
| 2006/0172048 | A1 | 8/2006 | Etchells et al. | 426/326 |
| 2006/0219578 | A1 * | 10/2006 | Owensby | 206/204 |
| 2006/0228449 | A1 * | 10/2006 | Tewari | 426/129 |
| 2007/0048415 | A1 * | 3/2007 | Etchells et al. | 426/235 |

OTHER PUBLICATIONS

Definition of Separate; Chambers 21st Century Dictionary. Eds. Mairi Robinson et al. London: Chambers Harrap, 2001.*
International Search Report dated Apr. 29, 2009 from the corresponding International Application No. PCT/US2009/036442.
Extended European Search Report dated Feb. 15, 2013 for corresponding European Patent Application No. 09718152.3 (8 pages).
European Office Action dated Nov. 25, 2013 for corresponding European Patent Application No. 09718152.3 (4 pages).

* cited by examiner

ABSORBENT PADS FOR FOOD PACKAGING

CROSS-REFERENCE TO RELATED APPLICATIONS

This application is the National Stage of International Application No. PCT/US2009/36442, filed on Mar. 7, 2009, which claims the benefit of U.S. Provisional Application No. 61/034,751, filed on Mar. 7, 2008, which are incorporated herein by reference.

BACKGROUND OF THE DISCLOSURE

1. Field of Disclosure

The present disclosure provides antimicrobiological packaging of food products with absorbent pads having active agents.

2. Description of the Related Art

Preservation of fresh food products such as red meat, poultry, seafood, and produce requires slowing microbiological growth, enzymatic activity, biochemical deterioration, and moisture loss. All may be achieved in part by reduction of product temperature to near the freezing point. However, chilling alone offers the least effect on preservation of fresh food products.

Packaging to help protect the food products from the environment in distribution channels represents a major adjunct, slowing moisture loss and effectively preventing microbiological recontamination. Among other enhancements capable of functioning synergistically with temperature reduction are control of gases in the package environment as in modified atmosphere packaging. Removal or reduction of oxygen slows growth of aerobic microorganisms indigenous to fresh or minimally processed foods, lipid oxidation leading to off-odors, and pigment oxidation leading to color changes and aerobic respiration reactions.

Elevation of carbon dioxide in the tissue of food products retards both microbiological growth and some enzymatic activity. Because of dissolution of carbon dioxide gas in muscle, fat and other tissue, and permeation and transmission of the gas through package structures, concentration of this gas in equilibrium with the food is often decreased below the optimum or even effective level.

Antimicrobials or chemicals that destroy or control growth of microorganisms may be incorporated into the food or on the food surface, or transferred to the food surface or interior from package structures.

In recent years, modified atmosphere packaging (MAP) has been increasingly applied for red meat, poultry and fresh cut produce to extend chilled shelf life. Similarly, in recent years, significant quantities of fresh red meat have been centrally packaged into case-ready form, most often employing a variant of MAP. On the other hand, most intact cuts of fresh beef and about half of ground beef continue to be packaged in retail grocery back rooms.

SUMMARY OF THE DISCLOSURE

The present disclosure provides packaging of food products with absorbent pads having active agents.

The present disclosure also provides absorbent pad or absorbent pad architectures that provide pockets to hold active agents, and control the release of the active agents.

The present disclosure further provides that the active agents are one or more carbon dioxide generators, oxygen scavengers, and antimicrobials.

The present disclosure yet further provides that the carbon dioxide generation or oxygen scavenging by active packaging, alone or coupled with antimicrobials in the absorbent pads, alter the atmosphere within the food packaging sufficiently to suppress microbiological growth in purge and in fresh or minimally processed backroom packaged meats and other food products.

The specific architecture of the absorbent pad, including the type and quantity of absorbent layers, as well as the location of active agents among the absorbent layers in the architecture of the absorbent pad, provides superior performance of the absorbent pad for preserving food products in food packaging.

DETAILED DESCRIPTION OF THE DISCLOSURE

Figure 1:
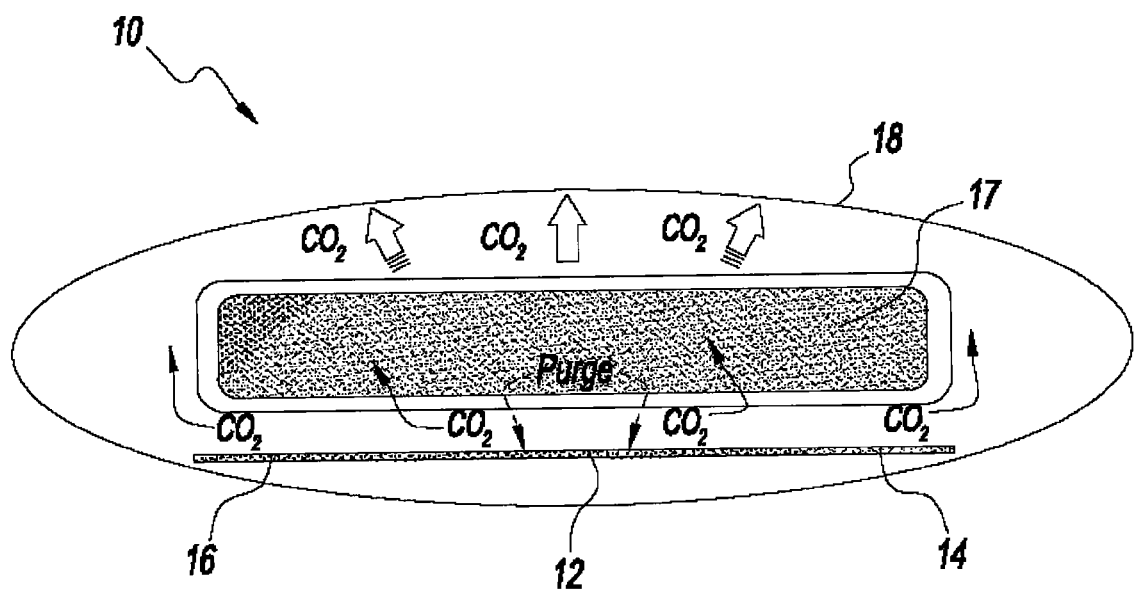
FIG. 1 is an illustration of antimicrobiological packaging of food products with absorbent pads having active agents.

Referring to the drawings, and in particular, FIG. 1, there is provided an overall system represented by reference number 10 of an antimicrobiological packaging of fresh food or minimally-processed food for food preservation according to the present disclosure.

An absorbent pad 12 of the present disclosure is positioned underneath food product 17. Absorbent pad 12 soaks up liquid purge from food product 17 that would otherwise collect on the bottom of food packaging or tray. Absorbent pad 12 contains an antimicrobial or antimicrobial agent 14 and an atmosphere modifying agent or modification system 16. Non-barrier packaging 18 is a storage container or bag that encloses food product 17 and absorbent pad 12.

As illustrated in FIG. 1, liquid purge dripping from food product 17 is absorbed into absorbent pad 12, thereby activating the active agents; i.e., antimicrobial 14 and the atmosphere modifying agent 16, shown in FIG. 1 as a $CO_2$ generation system. As the liquid purge is absorbed into absorbent pad 12, the components of the $CO_2$ generation system dissolve to react with each other to release $CO_2$ within the enclosed headspace of food packaging system 10. Although not illustrated in FIG. 1, atmosphere modifying agent 16 can be an oxygen ($O_2$) scavenger, such as an enzymatic $O_2$ scavenger, which is activated by liquid purge in absorbent pad 12. In addition, as the liquid purge contacts antimicrobial 14, antimicrobial 14 is dissolved, and inhibits bacterial growth in the purge.

Figure 2:
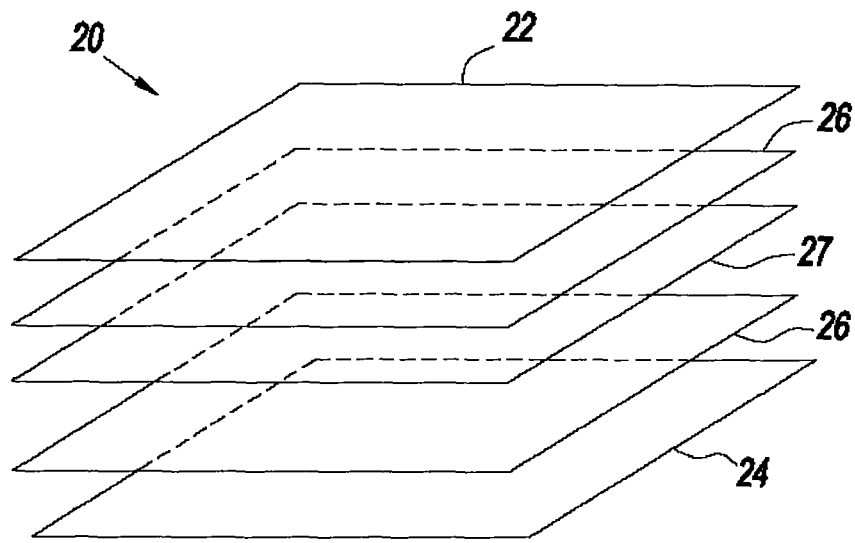
FIG. 2 is an illustration of pad architecture of an exemplary embodiment of an absorbent pad of the present disclosure.

Referring to FIG. 2, one exemplary absorbent pad or pad architecture 20 has a top layer 22 and a bottom layer 24 separated by one or more layers or tissue layers 26 of an absorbent material. The absorbent material absorbs liquid purge from the food product. Each tissue layer 26 itself can be formed of one or more tissues that are joined together to form the tissue layer.

As used in this application, the "architecture" of an absorbent pad means the structure and order of individual layers of absorbent material and active agents therein.

The architecture of absorbent pad 20 affects the performance of the packaging for preservation of food; that is, performance depends not only on the active agents used, but where the active agents are placed in the absorbent pad in relation to the absorbent tissue layers 26 and top and bottom layers 22,24. As will be illustrated by several exemplary embodiments in this application, active agents, or even the individual components that make up an active system (such as the individual chemical components of a $CO_2$ generation system) can be separated by absorbent tissue layers 26 in the structure of absorbent pad 20 to be activated at different times and thereby enhance food preservation.

The arrangement (or structure) of the two or more tissue layers 26 form pockets or compartments within the absorbent pad 20. A pocket means an area between two layers that can hold in place an active agent prior to use of the absorbent pad. A pocket can be an area between two adjacent tissue layers 26, between a top layer 22 and adjacent tissue layer 26, and/or between a bottom layer 24 and adjacent tissue layer 26. In FIG. 2, active agents 27 are positioned in a pocket formed between two separate tissue layers 26, and can be located on, in, or in-between tissue layers 26 that form the pocket. A food product would be placed in contact with top layer 22, and uptake of liquid purge from the food product is through bottom layer 24. Top layer 22 can be a film, such as polyethylene, polypropylene, polyester, or a non-woven material, and, in this exemplary embodiment, is polyethylene. Tissue layers 26 are any absorbent material that can absorb a large quantity of liquid purge from a food product, such as (but not limited to) fluff pulp, cellulose, or airlaid. Bottom layer 24 can be a non-woven material or a film, and in this exemplary embodiment, is a non-woven material.

In absorbent pad 20, active agents 27 are an antimicrobial agent and a $CO_2$ generation system. An example of an antimicrobial agent in absorbent pad 20 is a mixture of citric acid and sorbic acid. However, any food-safe antimicrobial can be employed, including other organic acids, quaternary ammonium compounds, and any combinations of such antimicrobials. An example of a $CO_2$ generation system for absorbent pad 20 is a mixture of an acid and a base, such as citric acid and sodium bicarbonate, respectively. In this exemplary embodiment, active agents 27 are placed together in the pocket (formed between two tissue layers 26).

The ratio of the amounts of citric acid to sorbic acid in the antimicrobial affects performance as an inhibitor of bacterial growth in purge. Consistent inhibition of bacterial growth in liquid purge can be obtained with a ratio of 7:3 of citric acid:sorbic acid. In addition, total amounts of the antimicrobial agent are advantageously scaled to the total absorbency of the absorbent pad 20. For example, absorbent pad 20 with absorbent tissue layers 26 that can absorb 50 grams of liquid purge can employ about 1.0 gram total of a mixture of citric acid and sorbic acid (at a 7:3 ratio, that is 0.7 g of citric acid and 0.3 g of sorbic acid), which is about 2.0 weight-% (wt %) of the nominal absorbency of the absorbent pad, for consistent inhibition of bacterial growth in liquid purge.

The word "about," as used herein for dimensions, weights, or measures of absorbency, means a range that is ±10% of the stated value, more preferably ±5% of the stated value, and most preferably ±1% of the stated value, including all subranges therebetween.

For the $CO_2$ generation system, a mixture of citric acid and sodium bicarbonate can be employed. The ratio of citric acid to sodium bicarbonate is one factor (with the primary factors being the architecture of the absorbent pad and the placement and type of the active agent in the absorbent pad) that affects the amount of $CO_2$ released within the food package. In this exemplary embodiment, a ratio of about 4:6 (citric acid:sodium bicarbonate) can be employed to release sufficient $CO_2$ for food preservation. However, other ratios may be selected based on other factors, such as the $pK_a$ of the acid selected.

The citric acid used as an active agent in the $CO_2$ generation system provides an additional beneficial function, by interacting with the sodium ion of sodium bicarbonate to create a citric acid/sodium citrate system acting as a buffer to maintain the pH within food-compatible ranges within the food package. The citric acid-citrate buffer system is also beneficial in absorbent pads having an $O_2$ scavenger as an atmosphere modifier, as excessively low pH can inactivate certain $O_2$ scavengers.

In the exemplary embodiment in FIG. 2, all active agents 27 are contained in one pocket formed between two tissue layers 26. This pad architecture provides a burst of $CO_2$ generation as the chemicals are activated by the liquid purge. Although the pad architecture in FIG. 2 is suitable for packaging of any type of food product, the pad architecture is particularly well-suited for preservation of beef, poultry, and pork.

Scaling, or selecting, the proper amounts of active agents to employ in the absorbent pad starts with the amount of absorbent material, as well as upon the type of food product being packaged and the amount of purge generated therefrom. For example, if an absorbent pad architecture employs too much absorbent material relative to the amount of liquid purge from the food, then there will be insufficient liquid to dissolve the active agents and bring them together to initiate activity. On the other hand, if the absorbent pad employs too little absorbent material, then liquid purge can "drown" or dilute the active agents and thereby impair their effectiveness. In addition, active agents placed in absorbent pads can themselves reduce the absorbency of the absorbent pad. Scaling the amounts and ratios of active agents in relation to the amount of absorbent material for the food packaging has a beneficial effect on preserving foods by absorbent pads of this disclosure.

Figure 3:
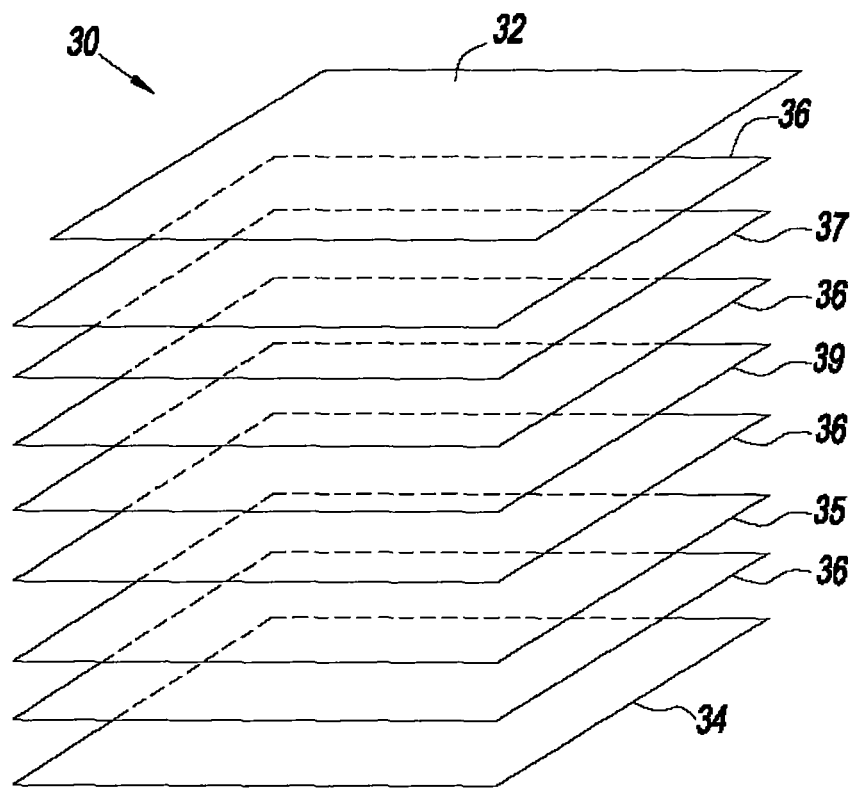
FIG. 3 is an illustration of pad architecture of another exemplary embodiment of an absorbent pad of the present disclosure.

Referring to FIG. 3, the pad architecture of absorbent pad 30 has two or more separate pockets formed between tissue layers into which active agents are placed. The absorbent pad 30 has top layer 32 and bottom layer 34 that are separated by two or more tissue layers 36. Each tissue layer 36 can be formed of one or more tissues that are joined together to form the tissue layer. Preferably, as shown in FIG. 3 for the embodiment there are four separate tissue layers 36. Active agents 35 and 37 are positioned in the pockets formed between a pair of two separate tissue layers 36. In addition, a superabsorbent material 39 can be placed in between two tissue layers 36. Superabsorbent material 39 is a membrane that provides a delayed activation of a second pocket of active agents 37. Examples of superabsorbent material 39 include, but are not limited to, superabsorbent polymers such as polyacrylate (and its laminates with cellulose, airlaids or non-wovens). Alternatively, layer 39 can be a non-woven, such as polyethylene.

In exemplary embodiment 30, active agent 37 is in a first pocket between a first tissue layer 36 and a second, separate tissue layer 36, and is a $CO_2$ generation system or a component thereof. As shown in FIG. 3, a second active agent 35 is in a second pocket between a third tissue layer 36 and a fourth tissue layer 36, and is a $CO_2$ generation system and an antimicrobial agent.

The liquid purge, which is absorbed into absorbent pad 30 through bottom layer 34, is absorbed in fourth tissue layer 36 and then contacts active agent(s) 35. This contact activates active agent 35, and provides a bacteriostatic effect on microbes in the purge. The amounts of antimicrobials present in active agent 35 are scaled to the absorbency of exemplary absorbent pad 30 at a 1 wt % to 2 wt % level, based on a nominal absorbency of the absorbent pad 30 (i.e., if the absorbent pad can absorb a total of about fifty (50) grams of purge, and the antimicrobial agent(s) are present in a total amount of about 0.5 grams, this equates to about 1 wt % of antimicrobial agent based on a nominal absorbency of the absorbent pad). In other embodiments of absorbent pad 30, the antimicrobial can be present in an amount between 1 wt % to 3 wt % based on a nominal absorbency of the absorbent pad.

As liquid purge soaks upward through absorbent pad 30, the purge is absorbed by the third tissue layer 36 and then by superabsorbent 39, which delays passage of the liquid purge before the purge is absorbed into the second tissue layer 36 and eventually the second pocket containing active agent(s) 37. When active agent 37 (which is a component of a $CO_2$ generation system in this embodiment) is activated by liquid from the absorbed purge and/or dissolved reagents of active agent 35, a delayed burst of $CO_2$ is produced into the food package headspace, thereby enhancing the preservation and shelf life of the packaged food product.

As a particular example of amounts used for active agents, for a fifty (50) gram absorbent pad, a total of about five (5) grams of a $CO_2$ generation system can be used to provide sufficient levels of $CO_2$ to enhance shelf life, because the $CO_2$ and $O_2$ are flowing somewhat freely through a film wrap. Also, some food products, particularly poultry, have a natural porosity that can absorb some of the $CO_2$. Absorbent pads 30 of this embodiment also provide a delayed release of $CO_2$, which is particularly beneficial for any food product having a longer shelf life, such as poultry, as compared with other pad architectures where the $CO_2$ generation system is completely expended after initial activation. Five (5) grams of a $CO_2$ generation system will generate about a thousand (1000) cc's of $CO_2$ over the course of the shelf life of the food product.

The chemical components of the $CO_2$ generation system (such as citric acid and sodium bicarbonate) can be split between the multiple pockets formed by tissue layers 36 such that the sodium bicarbonate ($NaHCO_3$) will be available to react in stages, making $NaHCO_3$ effectively the limiting agent of the reaction. For example, using the example where five (5) grams of the $CO_2$ generating chemicals are used, 1.5 grams of $NaHCO_3$ can be positioned as active agent 37 (i.e., in the upper/first pocket) of absorbent pad 30, while the remaining 3.5 grams of the $CO_2$ generation system (about 1.5 grams of sodium bicarbonate and about 2.0 grams of citric acid) are positioned between tissue layers as active agent 35 (i.e., in the lower/second pocket). The lower compartment also contains most or all of the antimicrobial, for example, 0.7 grams of citric acid and 0.3 grams of sorbic acid, which is a total of 1.0 grams (2 wt %) of an antimicrobial. All absorbent capacity from the lower tissue layers 36 will be exhausted before the purge soaks into the upper pocket to activate the remaining $CO_2$ generating chemicals. These stages of $CO_2$ release allow for a large amount of $CO_2$ to reach equilibrium inside the food package, and enough gas to be dissolved onto the surface of the meat (before escaping through the film wrap into the atmosphere) while providing sufficient $CO_2$ at a later time to enhance food preservation and extend shelf life.

Figure 4:
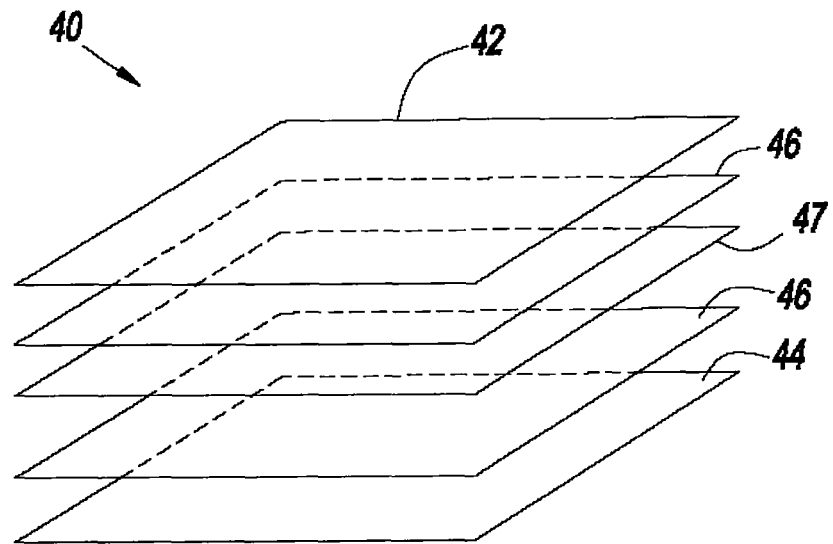
FIG. 4 is an illustration of pad architecture of another exemplary embodiment of an absorbent pad of the present disclosure.
Figure 5:
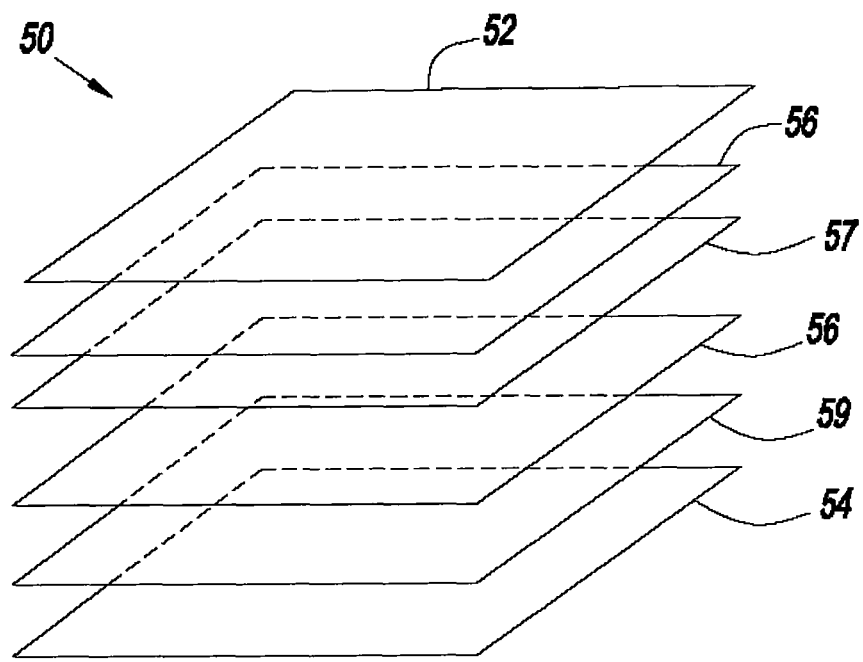
FIG. 5 is an illustration of pad architecture of another exemplary embodiment of an absorbent pad of the present disclosure.

FIGS. 4 and 5 illustrate architectures of two other exemplary embodiments of absorbent pads 40 and 50, respectively, which have active agents that include oxygen scavenging agents. Absorbent pads 40 and 50 can be used for any food products, but are well-suited for beef, poultry and pork.

Referring to FIG. 4, absorbent pad 40 can be employed in multiple individually-wrapped food packages that are placed in a master bag (also called a mother bag). Absorbent pad 40 has top layer 42 and bottom layer 44 that are separated by two or more layers of absorbent tissue 46. Absorbent pad 40 has a single pocket formed between two separate, adjacent tissue layers 46. Each tissue layer 46 can be formed of one or more tissues that are joined together to form the tissue layer. Active agent 47 is one or more oxygen scavengers deposited between two tissue layers 46. A food product would be placed in contact with top layer 42, and uptake of liquid purge from the food product is through bottom layer 44. Top layer 42 can be a film, such as polyethylene, polypropylene, polyester, or a non-woven material, and, in this exemplary embodiment, is polyethylene. Bottom layer 44 can be a non-woven material or a film, and in this exemplary embodiment, is a non-woven material.

Oxygen scavengers that can be used in absorbent pad 40 include oxygen scavenging enzyme systems, such as oxidase (including glucose oxidase and hexose oxidase), oxygenase, peroxidase, oxidoreductase, invertase, amylase, catalase, and maltase, or combinations thereof. The active agent 47 can also include both an oxygen scavenger and a $CO_2$ generation system. The amounts of oxygen scavengers used for absorbent pads 40 and 50 are determined by package weight, volume, and transmission rates of the packaging. The oxygen scavenger has to be activated with liquid (such as water), and so does not lose effectiveness (i.e., become "spent") through contact with ambient air before activation by purge, which is a benefit.

In an example using absorbent pad 40 in a master bag application, up to four individually-wrapped food products are placed inside a larger (master) bag. Through a gas flush, oxygen concentrations inside the master bag can be reduced a certain extent, and then further reduced by placing an $O_2$ scavenger agent inside the master bag. However, reducing oxygen concentrations in the master bag do not readily cause a significant decrease of oxygen concentrations within the headspace inside of each of the individually-wrapped food packages. Because non-barrier film wraps are generally porous, oxygen concentrations will eventually equilibrate, but this process can take a considerable length of time. Employing absorbent pad 40 with one or more oxygen scavenger causes a rapid reduction of oxygen concentrations within each individually-wrapped food package (i.e., from the inside-out), thereby achieving rapid, significant reduction of oxygen in the headspace of the food package.

The present disclosure provides a method of using absorbent pad 40 by placing absorbent food pad 40 and a food product in each food package of one or more individually-wrapped food packages, and placing those food packages inside a master bag to achieve rapid, significant reductions in oxygen concentrations within each individually-wrapped food package. The method enhances food preservation and extends the shelf life of the food products therein.

An antimicrobial can be added as an active agent in absorbent pad 40 to enhance the bacteriostatic effect on the purge. Likewise, a $CO_2$ generation system can be added as an active agent in absorbent pad 40 to generate or replace small amounts of $CO_2$. Oxygen scavengers can also be used with carbon monoxide (CO), which binds with hemoglobin rapidly and enhances red color ("bloom") in red meats. The system allows for CO generators as well as CO scavengers, as the prolonged presence of CO is undesirable after the food product has achieved "bloom."

Referring to FIG. 5, an absorbent pad 50 can be employed for flexible food packaging that is sealed under vacuum. Absorbent pad 50 has a top layer 52 and a bottom layer 54 that are separated by two or more absorbent tissue layers 56. Each tissue layer 56 itself can be formed of one or more tissues that are joined together to form the tissue layer. A food product would be placed in contact with top layer 52, and uptake of liquid purge from the food product is through bottom layer 54. Superabsorbent material 59 can also act a barrier so that all active agents remain in absorbent pad 50. Active agent 57 is one or more oxygen scavengers deposited between two tissue layers 56. Examples of oxygen scavengers are provided above.

A disadvantage of vacuum-packing certain food products (such as poultry and seafood) in flexible food packages is the perception of an off-odor when initially opening the food package, called "confinement odor." However, by placing absorbent pad 50 and a food product in a vacuum-packed food package, such as flexible plastic packaging, the perception of confinement odor is reduced when the package is opened.

Top layer 52 can be a film, such as polyethylene, polypropylene, polyester, or a non-woven material, and, in this exemplary embodiment, is polyethylene. Bottom layer 54 can be a non-woven material or a film, and in this exemplary embodiment, is a non-woven material. A superabsorbent material 59 can be placed between bottom layer 54 and the first tissue layer 56 to retain moisture and prevent migration of purge or active agents in vacuum packages.

Although not illustrated in the present drawings, top layers 42 and 52, respectively, that contact the food product, can be perforated to allow for faster uptake of liquid moisture into the pocket containing active agents and, in conjunction with purge absorbed through the bottom layers 44 and 54, respectively, activate the oxygen scavengers and/or other active agents more rapidly.

Figure 6:
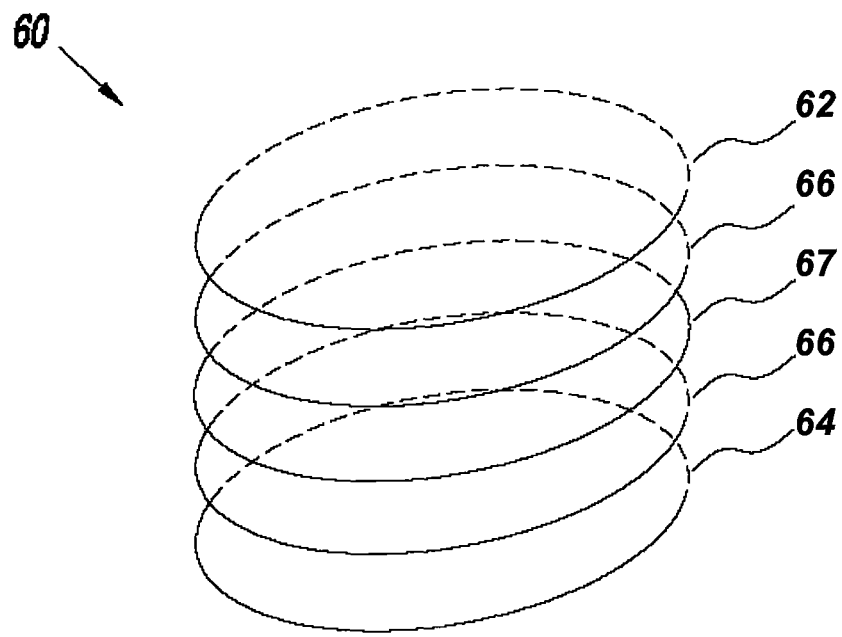
FIG. 6 is an illustration of pad architecture of another exemplary embodiment of an absorbent pad of the present disclosure.

Referring to FIG. 6, absorbent pad 60 is provided for food preservation of any type of food, and is well-suited for preservation of fruits, such as pomegranate arils. As shown in FIG. 6, absorbent pad 60 can be round-shaped to fit directly into the bottom of pomegranate aril bowls or other similarly-shaped fruit containers. Absorbent pad 60 has a top layer 62 and a bottom layer 64 that are separated by two or more absorbent tissue layers 66. Each tissue layer 66 can be formed of one or more tissues that are joined together to form the tissue layer. The fruit product would be placed in contact with top layer 62, and uptake of liquid purge from the food product is through bottom layer 64. Between two tissue layers 66 that form a pocket is an active agent 67. Active agent 67 is one or more atmosphere modifying agent, such as a $CO_2$ generation system and/or one or more oxygen scavengers.

For packaging of fruit, such as pomegranates, requirements for carbon dioxide and oxygen concentrations are influenced by the reduced volume as well as the optimal carbon dioxide/oxygen levels for certain types of fruit. When a carbon dioxide generation system is used, $CO_2$ needs to be generated in high enough amounts to maintain levels inside bowls with micro-perforated film with higher gas transmission rates. As an example of an amount of oxygen scavenger that can be used in absorbent pad 60, about one (1) gram of oxygen scavenging chemical is present between tissue layers to reduce $O_2$ percentages to optimal levels (about 2%) inside a barrier film. Oxygen scavengers can reduce oxygen levels by about 30 cc/gram in 24 hours.

Absorbent pads 60 can also have perforations in top layer 62 (in contact with the fruit). Bottom layer 64 can be made of a non-woven material for increased moisture uptake.

Figure 7:
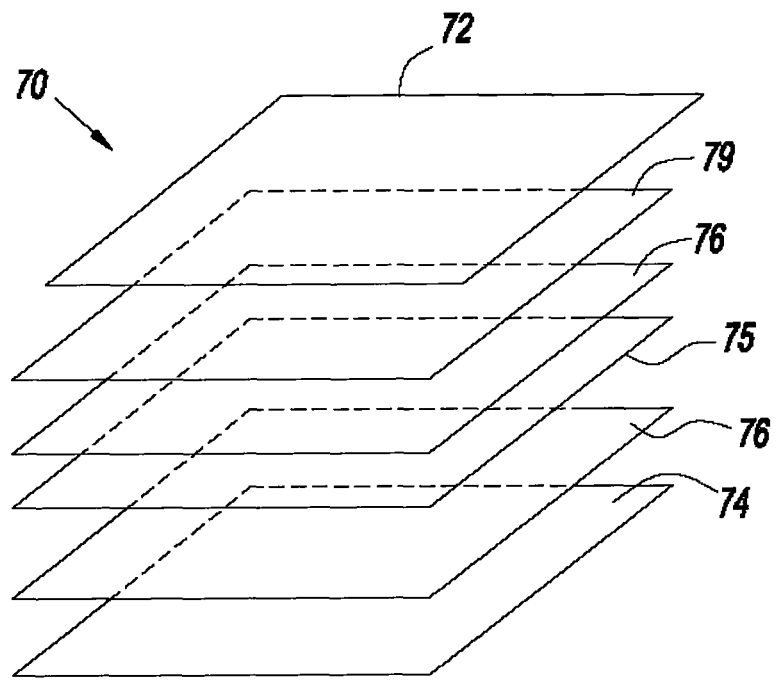
FIG. 7 is an illustration of pad architecture of another exemplary embodiment of an absorbent pad of the present disclosure.

Referring to FIG. 7, absorbent pad 70 that can be used for any food product, and is well-suited for packaging vegetables, has a top layer 72 and a bottom layer 74 that are separated by two or more absorbent tissue layers 76. Each tissue layer 76 can be formed of one or more tissues that are joined together to form the tissue layer. The food product (such as celery) would be placed in contact with top layer 72, and uptake of liquid purge from the food product is through bottom layer 74. Between two tissue layers 76 that form a pocket is an active agent 77 that is one or more atmosphere modifying agent, such as a $CO_2$ generation system and/or one or more oxygen scavengers. For this embodiment, superabsorbent 79 is positioned directly below top layer 72 and above the pocket formed between tissue layers 76, so that active agents 75 are quickly activated and expended. The superabsorbent layer captures extra moisture or liquid, and effectively retains it inside the pad after the absorbent capacity of absorbent tissue is reached. Absorbent pad 70 generally does not have a perforated top layer 72, so all liquid or moisture passes up through bottom layer 74 and tissue layers 76 before reaching superabsorbent 79.

Studies were conducted with absorbent pads of the present disclosure for packaging food products such as London Broil cuts of beef, chicken drumsticks, chicken breasts and chicken breast meat, as provided below.

A study was conducted where approximately a half-pound of beef was packaged in commercial retail grocery backrooms. Packages for London Broil beef cuts, size 3P trays, were expanded polystyrene (EPS) with polyvinyl chloride (PVC) overwrap, and tack seal closed (i.e., the package was not hermetically sealed). The film was intentionally highly gas-permeable to permit entry of oxygen to retain desired red oxymyoglobin color of meat. Absorbent pads were Paper Pak Industries XtendaPak pulp tissue type, with pad architecture in absorbent pad 20 (shown in FIG. 2), with low density polyethylene film as a bottom layer and perforated low density polyethylene film as a top layer in contact with the beef. Pad dimensions were 4" to 4½ (101.6 mm to 114.3 mm) by 7" to 7¼ (177.8 mm to 184.1 mm). Control pads contained no active ingredients. In the treatment packages, a $CO_2$ generator and an antimicrobial were each deposited as a dry mix on two different interior layers of the multilayer pulp pad. The amounts of the $CO_2$ generator and the antimicrobial in the active packaging treatment pads are provided in Table 1.

TABLE 1

Active Packaging Treatments for 350 to 500 g London Broil beef, packaged in a Supermarket backroom

| Treatment Code | ANTIMICROBIAL LAYER | | CARBON DIOXIDE GENERATING LAYER | |
|---|---|---|---|---|
| | Citric acid (g) | Sorbic Acid (g) | Citric Acid (g) | Sodium Bicarbonate (g) |
| XUZ-40 | 0.56 | 0.24 | 0.96 | 1.44 |
| XUZ-50 | 0.70 | 0.30 | 1.20 | 1.80 |
| XUZ-75 | 0.70 | 0.30 | 1.32 | 1.98 |
| Control | 0 | 0 | 0 | 0 |

The beef was cut and packaged in a local supermarket backroom and maintained chilled at 36-40° F. (2.2-4.4° C.) throughout the six-day trial period.

A second set of trials of food packaging was conducted with cuts of London Broil beef using absorbent pads having a larger surface area (outer dimensions of 6" by 8" [152.4 mm by 203.2 mm] as compared with absorbent pads having dimensions of 4½" by 7¼" [114.3 mm by 184.1 mm] for the tray packaging study above) that were placed in the bottom of a low density polyethylene pouch, closed with a zipper and laid on its side. The pad architecture was absorbent pad 20, as illustrated in FIG. 2.

Pad mass was measured by recording the weights of individual pads at the beginning of the test and recording the weight gain of the pads plus any free liquid purge available at each time interval. Additionally, free purge in the tray that was not collected in the pad was weighed.

The beef was placed in a sterile sampling bag, and the bag was shaken vigorously for 25 seconds to suspend the bacteria from the meat. This solution now was 1:1, and several dilutions were plated. The beef was also placed in a sterile stomacher bag, diluted 1:10 with sterile phosphate buffer, and stomached for 1 minute; the rinsate was analyzed to determine initial contamination level. Product sample rinsates and pad extract samples were assayed for aerobic plate counts (APC) (incubated at 37° C. for 2 days).

Purge Gas Testing: on each testing day, samples were analyzed by withdrawing a gas sample through a septum using a Mocon 325 portable $O_2/CO_2$ analyzer.

Organoleptic Analysis: after samples were tested for gas, the packages were opened. With a panel of three experienced persons, each piece of beef was examined, smelled and touched to measure color, odor, and texture to touch on each test day (Table 2). Hedonic scale ranges were from 1 to 9, with 9 being the highest value, 5 being borderline for consumer acceptability, and 1 being completely unacceptable in the panel's judgment.

TABLE 2

Criteria Applied for Judging Sensory Characteristics of Meat

| | Color | Odor | Texture | Overall acceptability |
|---|---|---|---|---|
| 9 | Fresh transparent pink | Normal fresh meat odor | Firm w/ normal moisture | Extremely desirable |
| 8 | | | | |
| 7 | Few white blotches present | Normal meat odor | | Desirable |
| 6 | | | | |
| 5 | Losing transparent color/slight orange | Aged color | | Borderline acceptable |
| 4 | | | | |
| 3 | Visible discoloration | Slight objectionable odor | Soft meat, mushy, slimy | Slightly undesirable |
| 2 | | | | |
| 1 | Visible colonies/mold | Spoiled odor | Slimy with film layer | Extremely undesirable |

All bacteria counts were expressed as CFU (colony forming units) or log 10 CFU per mL. On each testing day, the absorbent pads were squeezed into a sterile bag and plated. After aseptically taking the aliquot for microbiological testing, pH was measured on the remaining purge.

Although the supermarket backroom packaging for beef has little to no gas barrier (expanded polystyrene tray with heat tacked polyvinyl chloride film overwrap), it was hypothesized that the carbon dioxide generating chemicals in the absorbent pad, upon being activated by the liquid purge, would produce sufficient carbon dioxide to exert a modified atmosphere microbiostatic effect in the purge and on the beef. In addition, the growth of indigenous microorganisms consumes oxygen and produces carbon dioxide.

Table 3 shows the gas concentrations measured in the packages of beef at each time interval prior to opening for sampling.

TABLE 3

Carbon Dioxide Concentrations in Tray Pack Package Headspace - London Broil Beef Packaged in Supermarket Backroom

| Day | Control (1%) | Active Package Treatment (%) |
|---|---|---|
| 1 | 0 | 0 |
| 2 | 0 | 2 |
| 3 | 1.5 | 4.4 |
| 4 | 1.6 | 2.6 |
| 5 | 0.6 | 2.9 |
| 6 | 1.0 | 3.0 |
| 7 | 1.2 | 2.3 |

The carbon dioxide concentrations increased to well above ambient as one result of the presence of a carbon dioxide generating absorbent pad. The data (not shown) also indicate a very slight reduction in headspace oxygen concentration to as low as 18.5% on the seventh day at 36-40° F. (2.2-4.4° C.).

A second hypothesis was that by reducing the pH of the system through elevated carbon dioxide dissolution in the purge, the quantity of purge lost would be decreased. Table 4 indicates the total amount of purge lost as measured by the quantities measured in the pad plus free liquid.

TABLE 4

Measured Purge Mass in Tray Pack Packages of London Broil Beef Packaged in Supermarket backroom (35-40° F.) (1.7-4.4° C.)

| Day | Control (grams) | Pad containing active package chemicals (grams) |
|---|---|---|
| 1 | 0 | 0 |
| 4 | 10 | 5 |
| 6 | 12 | 5 |
| 7 | 8 | 3 |
| 8 | 14 | — |
| 10 | 18 | 8 |

Test results indicate that the active packaging treatment significantly reduces the quantity of purge, representing a potentially major economic benefit for fresh meat packagers applying this technology.

Microbiological growth should be a key measure of the effectiveness of active absorbent pads. Aerobic microbiological counts of both the meat and the purge are shown in Table 5.

TABLE 5

Aerobic Plate Counts of Meat and Purge for London Broil Tray Packs
Packaged in Supermarket Backroom (36-40° F.) (2.2-4.4° C.).

| | Meat (log CFU/ml) | | Purge (log CFU/ml) | |
|---|---|---|---|---|
| Day | Control | Active Package | Control | Active Package |
| 1 | 4.6 | 4.7 | 4.5 | 4.5 |
| 2 | 4.6 | 4.6 | 4.5 | 0 |
| 3 | 4.9 | 4.9 | 4.5 | 0 |
| 4 | 5.1 | 5.0 | 4.1 | 0 |
| 5 | 5.3 | 5.1 | 6.1 | 0 |
| 6 | 5.2 | 5.1 | 6.3 | 0 |
| 7 | 6.1 | 5.8 | 6.2 | 0 |

The purge, a notable source of microbiological load that produces adverse odor, shows little or no aerobic microbiological count after the first day. Approximately one log difference in aerobic count on the meat itself was demonstrated after the fourth day of storage at 36-40° F. (2.2-4.4° C.).

Table 6 shows the sensory odor scores for the London Broil beef throughout the test period.

TABLE 6

Odor Values of London Broil in Tray Pack packaged in
supermarket backroom (36-40° F.) (2.2-4.4° C.)

| Day | Control (9 = best, 1 = unacceptable) | Active Pack (9 = best, 1 = unacceptable) |
|---|---|---|
| 0 | 9 | 9 |
| 1 | 9 | 9 |
| 2 | 8 | 8.8 |
| 3 | 6.8 | 7.3 |
| 4 | 6.7 | 7.7 |
| 5 | 5 | 6.3 |
| 6 | 3.9 | 3.3 |

Sensory odor values demonstrated measurable differences from day two through day five at 36-40° F. (2.2-4.4° C.), suggesting the effectiveness of suppression of microbiological growth in both the purge and the meat. Product with the active packaging was acceptable through five days whereas the control was acceptable only for four days, a one day advantage, which is a significant benefit for packaging of fresh beef.

Table 7 shows the carbon dioxide concentrations in pouches containing larger-dimension absorbent pads (6" by 8" [152.4 mm by 203.2 mm]), with pad architecture as illustrated for absorbent pad 20 in FIG. 2.

TABLE 7

Carbon Dioxide Concentrations of Zipper Closed,
Polyethylene Pouch Package Headspace - London Broil Beef

| Day | Control (%) | Active Packaging (%) |
|---|---|---|
| 1 | 0 | 0 |
| 2 | 0 | 2 |
| 3 | 1.5 | 4.4 |
| 4 | 1.5 | 2.6 |
| 5 | 0.7 | 2.7 |
| 6 | 1.0 | 2.9 |
| 7 | 1.2 | 2.2 |

The results demonstrate increases in headspace carbon dioxide that can be attributed to the present of carbon dioxide generation from active agents the absorbent pads. Carbon dioxide elevation in the controls is due to microbiological activity. Oxygen concentrations in the control and treatment packages were measured at about the same throughout the test period.

Table 8 shows the aerobic microbiological growth in pouches containing the larger dimension active packaging absorbent pads.

TABLE 8

Aerobic Microbiological Plate Counts of Meat for London
Broil Beef Pouch Packages

| Day | Control (log CFU/ml) | Active Package Treatment (log CFU/ml) |
|---|---|---|
| 1 | 4.9 | 4.9 |
| 2 | 5.1 | 5.1 |
| 3 | 5.2 | 5.2 |
| 4 | 5.5 | 5.5 |
| 5 | 5.5 | 5.3 |
| 6 | 5.5 | 5.4 |
| 7 | 6.2 | 5.9 |

From the data in Tables 7 and 8, carbon dioxide levels within these non-gas-barrier packages were observed to be increased by the presence of active agents in absorbent pads in food packaging. Carbon dioxide can function as a microbiostatic agent in food packaging. Aerobic microbiological counts in purge were markedly reduced by the combination of antimicrobial and carbon dioxide generator. Aerobic microbiological growth in the beef was reduced by less than one log by the combination of active agents in the absorbent pads. Also, sensory values attributable to the retardation of microbiological activity in the purge and the meat were better-retained in packages with active agents than in the controls. The data suggest that one to two days of additional chilled shelf life were achieved.

For studies with packaging of poultry, the protocols were similar to those described above for beef, except that the storage times at 36-40° F. (2.2-4.4° C.) were extended to 14 days. Products tested included boneless, skinless breasts, drumsticks, and thighs of chicken. The amounts of active agents in the absorbent pads is shown in Table 9:

TABLE 9

Active Packaging Treatment for Chicken in Tray Pack

| | Antimicrobial | | $CO_2$ generator | |
|---|---|---|---|---|
| Treatment Code | Citric acid (g) | Sorbic acid (g) | Citric acid (g) | Sodium bicarbonate (g) |
| XUZ-52-50L | 0.7 | 0.3 | 2.0 | 3.0 |

The absorbent pad architecture in this study of packaging with chicken was similar to absorbent pad 30, as illustrated in FIG. 3, where layer 39 is non-woven polyethylene. Pad architecture was from the poultry side in: polyethylene/two tissue layers/carbon dioxide generator/two tissue layers/non-woven polyethylene/carbon dioxide generator plus antimicrobial/two tissue layers/non-woven polyethylene: bottom or tray side.

The poultry products were packaged by a poultry processor in 3P expanded polystyrene trays overwrapped with polyethylene film and delivered at 37° F. (2.7° C.) for evaluation. The poultry packages were not hermetically sealed, and were not gas barriers, and so gas transmitted relatively freely between the interior environment and the outside air. One difference is that the packaging was performed in a nearby factory on a commercial poultry packaging line rather than in a backroom.

Table 10 shows gas concentrations measured in the headspaces of packages of chicken legs/drumsticks.

TABLE 10

Oxygen and Carbon Dioxide Concentrations with Tray Packs of Chicken Legs/Drumsticks

| | Control | | Active package treatment | |
|---|---|---|---|---|
| Day | $O_2$ (%) | $CO_2$ (%) | $O_2$ (%) | $CO_2$ (%) |
| 1 | 18.2 | 3.1 | 18.9 | 10.6 |
| 3 | 17.6 | 2.7 | 18.0 | 4.4 |
| 5 | 17.9 | 2.3 | 17.8 | 3.7 |
| 7 | 17.9 | 2.0 | 18.5 | 3.3 |
| 9 | 21.0 | 1.9 | 21.0 | 2.7 |
| 11 | 18.3 | 1.8 | 17.8 | 2.6 |
| 12 | 18.1 | 1.5 | 18.1 | 2.2 |
| 13 | 17.2 | 2.2 | 17.0 | 2.5 |
| 14 | 18.4 | 1.9 | 19.2 | 2.1 |
| 15 | 18.1 | 1.9 | 18.7 | 2.3 |
| 16 | 16.8 | 2.2 | 18.6 | 2.1 |
| 18 | 15.4 | 2.4 | 17.6 | 1.9 |
| 19 | 13.2 | 2.5 | 16.5 | 2.4 |

The high level of carbon dioxide on the first day in the active package was due to the immediate reaction of liquid purge to generate carbon dioxide from the dry chemicals. Water reduction was probably due to the fact that carbon dioxide dissolves in the chicken tissue.

Table 11 shows microbiological growth in poultry during the test period.

TABLE 11

Aerobic Microbiological Plate Counts of Chicken Legs/Drumsticks in Overwrapped Tray Packages

| Day | Control (CFU/ml) | Treatment (CFU/ml) |
|---|---|---|
| 1 | 2.3 | 2.1 |
| 3 | 2.6 | 2.1 |
| 5 | 2.4 | 2.1 |
| 7 | 3.0 | 2.8 |
| 9 | 4.1 | 3.6 |
| 11 | 5.2 | 3.9 |
| 12 | 5.7 | 4.6 |
| 13 | 6.5 | 5.1 |
| 14 | 6.3 | 5.5 |
| 15 | 6.7 | 6.1 |
| 16 | 6.9 | 6.1 |
| 18 | 7.1 | 6.7 |
| 19 | 7.1 | 7.1 |

Aerobic microbiological counts in packages containing absorbent pads with active agents demonstrated about a one day advantage over the control from day seven onward.

Table 12 depicts measured characteristics of the purge in and around the absorbent pads of chicken leg/drumstick packages over the trial period at 36-40° F. (2.2-4.4° C.).

TABLE 12

Purge Quantity and pH Chicken Leg/Drumstick Package

| | Control | | Treatment | |
|---|---|---|---|---|
| Day | Pad Weight (grams) | Purge pH | Pad Weight (grams) | Purge pH |
| 1 | 25.2 | 6.6 | 40.0 | 5.7 |
| 3 | 28.7 | 6.7 | 34.6 | 5.9 |
| 5 | 30.1 | 6.9 | 36.8 | 6.0 |

TABLE 12-continued

Purge Quantity and pH Chicken Leg/Drumstick Package

| | Control | | Treatment | |
|---|---|---|---|---|
| Day | Pad Weight (grams) | Purge pH | Pad Weight (grams) | Purge pH |
| 7 | 28.0 | 6.7 | 33.0 | 5.7 |
| 9 | 31.3 | 6.9 | 39.6 | 5.7 |
| 11 | 31.9 | 7.1 | 38.2 | 5.6 |
| 12 | 32.0 | 7.4 | 39.6 | 5.9 |
| 13 | 29.1 | 7.1 | 40.9 | 5.6 |
| 14 | 32.7 | 7.0 | 57.5 | 6.1 |
| 15 | 24.8 | 7.0 | 49.2 | 6.4 |
| 16 | 30.9 | 7.1 | 33.3 | 5.9 |
| 17 | 28.8 | 7.0 | 46.9 | 6.1 |
| 18 | 31.0 | 7.0 | 40.3 | 5.9 |

A significant difference in pH is due to the generation of carbon dioxide, some of which dissolves in the liquid, forming carbonic acid. The reduction in pH leads to a reduction in growth rate of most aerobic microorganisms.

Table 13 shows the aerobic microbiological growth in the purge of the packages, including in the absorbent pads.

TABLE 13

Aerobic Microbiological Plate Counts in Chicken Legs/Drumsticks Purge

| Day | Control (CFU/ml) | Treatment (CFU/ml) |
|---|---|---|
| 1 | 3.4 | 2.4 |
| 3 | 3.7 | 2.5 |
| 5 | 3.0 | 2.2 |
| 7 | 3.2 | 3.4 |
| 9 | 3.9 | 3.4 |
| 11 | 5.6 | 3.3 |
| 12 | 5.8 | 3.6 |
| 13 | 7.5 | 4.0 |
| 14 | 6.8 | 4.8 |
| 15 | 6.9 | 5.3 |
| 16 | 7.6 | 4.8 |
| 17 | 7.6 | 6.0 |
| 18 | 7.7 | 6.5 |

A significant difference in aerobic microbiological count in favor of the treated absorbent pad began on the ninth day and widened to more than one log in subsequent days.

Differences in microbiological growth in purge suggest that sensory benefits should result as demonstrated in Table 14, which provides Odor Values of Chicken Leg/Drumstick in Retail Tray Packages.

TABLE 14

Odor Values of Chicken Leg/Drumstick in Retail Tray Packages

| Day | Control (9 = best; 1 unacceptable) | Active Packaging Treatment (9 = best; 1 = unacceptable) |
|---|---|---|
| 1 | 9.0 | 9.0 |
| 3 | 9.0 | 9.0 |
| 5 | 8.7 | 9.0 |
| 7 | 9.0 | 9.0 |
| 9 | 9.0 | 8.5 |
| 11 | 8.0 | 9.0 |
| 12 | 8.0 | 8.3 |
| 13 | 6.5 | 7.5 |
| 14 | 6.5 | 7.5 |
| 15 | 5.5 | 5.8 |
| 16 | 4.3 | 5.5 |

TABLE 14-continued

Odor Values of Chicken Leg/Drumstick in Retail Tray Packages

| Day | Control (9 = best; 1 unacceptable) | Active Packaging Treatment (9 = best; 1 = unacceptable) |
|---|---|---|
| 18 | 3.5 | 3.5 |
| 19 | 3.3 | 2.8 |

Sensory characteristics appear to track microbiological growth in the purge, with differences favoring the treated packages appearing between day 9 and day 11, and continuing through day 16. Since an important criterion for consumer acceptance is flavor, the reduction in production of spoilage odors extends refrigerated shelf life.

The studies of beef and poultry demonstrate that using absorbent pads of the present disclosure for packaged fresh beef and poultry provides one to four day extensions of refrigerated shelf life. The results indicate that carbon dioxide levels are elevated in food package headspace, partially as a result of liquid purge reacting with dry chemicals in the absorbent pads, and partially from carbon dioxide generated by aerobic bacterial growth. Another effect is reduction in pH of the purge. The data also suggest a reduction of purge mass in food packages containing absorbent pads with active agents of the present disclosure. Differences in aerobic microbiological counts were noted in the purge of both beef and chicken leg/drumstick packages in absorbent pads having active agents as compared with controls. Sensory odor scores for both beef and chicken leg/drumstick packages indicated one to five day differences to the onset of marginally acceptable sensory odor scores, a significant benefit. The studies clearly demonstrate that absorbent pads of the present disclosure can extend refrigerated shelf-life of meat products in non-hermetic, non-barrier packaging of commercial beef and poultry.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances that fall within the scope of the appended claims.

What is claimed is:

1. An absorbent food pad comprising:
    a body having an architecture comprising in the following order from top to bottom:
        a top layer;
        a first tissue layer, wherein the top layer is separate from the first tissue layer;
        a second tissue layer, wherein the second tissue layer is separate from the first tissue layer and forms a first pocket therebetween;
        a third tissue layer, wherein the third tissue layer is separate from the second tissue layer and forms a second pocket therebetween;
        a fourth tissue layer, wherein the fourth tissue layer is separate from the third tissue layer to form a third pocket therebetween; and
        a bottom layer is separate from the fourth tissue layer, wherein the top layer, the bottom layer, the first tissue layer, the second tissue layer, the third tissue layer and the fourth tissue layer are each a separate layer, wherein the first pocket formed by the first and second tissue layers, and the third pocket formed by the third and fourth tissue layers each have an active agent therein, and wherein the active agent is liquid-activated; and
    a superabsorbent is disposed in the second pocket formed by the second and third tissue layers, so that the superabsorbent is isolated from the active agents in the first and third pockets, wherein the superabsorbent delays activation of the active agent in the first pocket with respect to activation of the active agent in the third pocket,
    wherein the active agent in the first and third pockets is selected from the group consisting of an antimicrobial, a $CO_2$ generation system, an oxygen scavenger, and any combinations thereof.

2. The absorbent food pad of claim 1, wherein the active agent in the pocket formed by the third and fourth tissue layers is the $CO_2$ generation system, and wherein the $CO_2$ generation system is citric acid and sodium bicarbonate.

3. The absorbent food pad of claim 2, wherein the $CO_2$ generation system is forty percent citric acid and sixty percent sodium bicarbonate.

4. The absorbent food pad of claim 1, wherein the active agent in the pocket formed by the third and fourth tissue layers is the antimicrobial.

5. The absorbent food pad of claim 4, wherein the antimicrobial is citric acid and sorbic acid.

6. The absorbent food pad of claim 5, wherein the citric acid and sorbic acid are present at a ratio of 7 to 3.

7. The absorbent food pad of claim 1, wherein the active agent in the pocket formed by the third and fourth tissue layers is the oxygen scavenger.

8. The absorbent food pad of claim 7, wherein the oxygen scavenger is an enzyme.

9. The absorbent food pad of claim 1, wherein the top layer is a film selected from the group consisting of polyethylene, polypropylene, polyester, a non-woven material, and any combinations thereof.

10. The absorbent food pad of claim 1, wherein the bottom layer is a non-woven material or a film.

11. The absorbent food pad of claim 1, wherein the first tissue layer and/or the second tissue layer is formed of two or more tissues that are joined together.

12. The absorbent food pad of claim 1, wherein the active agent in the first pocket is a component of a $CO_2$ generation system.

13. The absorbent food pad of claim 1, wherein the active agent in the third pocket is selected from the group and different than the active agent in the first pocket.

14. The absorbent food pad of claim 1, wherein the top layer further comprises a surface capable of receiving a food product thereon, wherein the food product is selected from the group consisting of fruit, vegetable, beef, chicken, poultry and seafood.

15. The absorbent food pad according to claim 1, wherein the active agents are present in a total amount that is scaled in relation to the total absorbency of the absorbent food pad.

16. A method of using the absorbent food pad of claim 1, comprising:
    placing the absorbent food pad in a food package;
    placing a food product on the top layer of the absorbent food pad in the food package,
    wherein the delayed activation of the active agent in the first pocket caused by the superabsorbent in the second pocket results in extended shelf life of the food product in the food package.

17. A method of using the absorbent food pad of claim 7, to reduce confinement odor in a vacuum-packed food package, comprising:
- placing the absorbent food pad and a food product in a food package, and
- vacuuming and sealing the food package to form the vacuum-packed food package,
- wherein the oxygen scavenger in the absorbent food pad reduces the amount of oxygen in the vacuum-packed food package,
- thereby reducing confinement odor when the vacuum-packed food package is initially opened.

18. A method of using the absorbent food pad according to claim 7, to extend shelf-life of a food product in a food package, comprising:
- placing the absorbent food pad and a food product in each of one or more individually-wrapped food packages; and
- placing each of the one or more individually-wrapped food packages inside a master bag,
- wherein the oxygen scavenger in the absorbent food pad reduces oxygen concentration in the individually-wrapped food package in which the absorbent food pad is placed, and thereby extends shelf-life of the food product in the individually-wrapped food package.

\* \* \* \* \*